US012684019B2

(12) United States Patent
Khatam et al.

(10) Patent No.: US 12,684,019 B2
(45) Date of Patent: Jul. 14, 2026

(54) SYSTEM AND METHOD FOR AUTOMATING CONFIGURATION SERVICES IN ENTERPRISE SYSTEMS

(71) Applicant: Saudi Arabian Oil Company, Dhahran (SA)

(72) Inventors: Ali H. Khatam, Saihat (SA); AlAlaa N. Tashkandi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 187 days.

(21) Appl. No.: 18/777,106

(22) Filed: Jul. 18, 2024

(65) Prior Publication Data

US 2026/0025413 A1　　Jan. 22, 2026

(51) Int. Cl.
*H04L 9/40* (2022.01)
*H04L 67/02* (2022.01)

(52) U.S. Cl.
CPC .............. *H04L 63/20* (2013.01); *H04L 67/02* (2013.01)

(58) Field of Classification Search
CPC ................................ H04L 63/20; H04L 67/02
USPC .............................................................. 726/1
See application file for complete search history.

(56) References Cited

U.S. PATENT DOCUMENTS 8,850,219 B2 * 9/2014 Dapkus ................. H04L 9/3234
713/185
9,438,659 B2 * 9/2016 Jasperson ............... G06F 16/95

| | | | | |
|---|---|---|---|---|
| 10,884,732 | B1 * | 1/2021 | Zolotow | ................... G06F 8/76 |
| 11,252,147 | B2 * | 2/2022 | Zeng | ................... H04L 63/0807 |
| 2012/0311157 | A1 * | 12/2012 | Erickson | ................. G06F 9/541 |
| | | | | 709/226 |
| 2013/0346476 | A1 * | 12/2013 | Jasperson | ............. H04L 67/142 |
| | | | | 709/203 |
| 2016/0344744 | A1 * | 11/2016 | Tanoni | ................... H04W 12/06 |
| 2022/0210196 | A1 * | 6/2022 | Parekh | ................ H04L 63/0227 |

OTHER PUBLICATIONS

Chen et al.; A service management architecture component model; 2011 7th International Conference on Network and Service Management, Paris, France, 2011, pp. 1-4.

* cited by examiner

*Primary Examiner* — Liang Che A Wang
(74) *Attorney, Agent, or Firm* — Leason Ellis LLP

(57) ABSTRACT

Information technology service management (ITSM) is provided by at least one computing device, including by accessing plurality of ITSM requests. For each one, a determination is made whether the respective ITSM request is valid. Where the request is not valid, a status identifier is assigned. Where the request is valid, the computing device(s) identifies, in the respective ITSM request, request information representing at least a request for action associated with a back-end service, a target service name, and a target system. Further, the computing device(s) distinguishes in the respective ITSM request, as a function of at least the request information, a technical infrastructure detail associated with the back-end service. Moreover, the computing device(s) generates, as a function of the technical infrastructure detail, a notification for implementing the action and transmits to at least one computing device associated with the back-end service the notification for implementing the action.

15 Claims, 13 Drawing Sheets

100

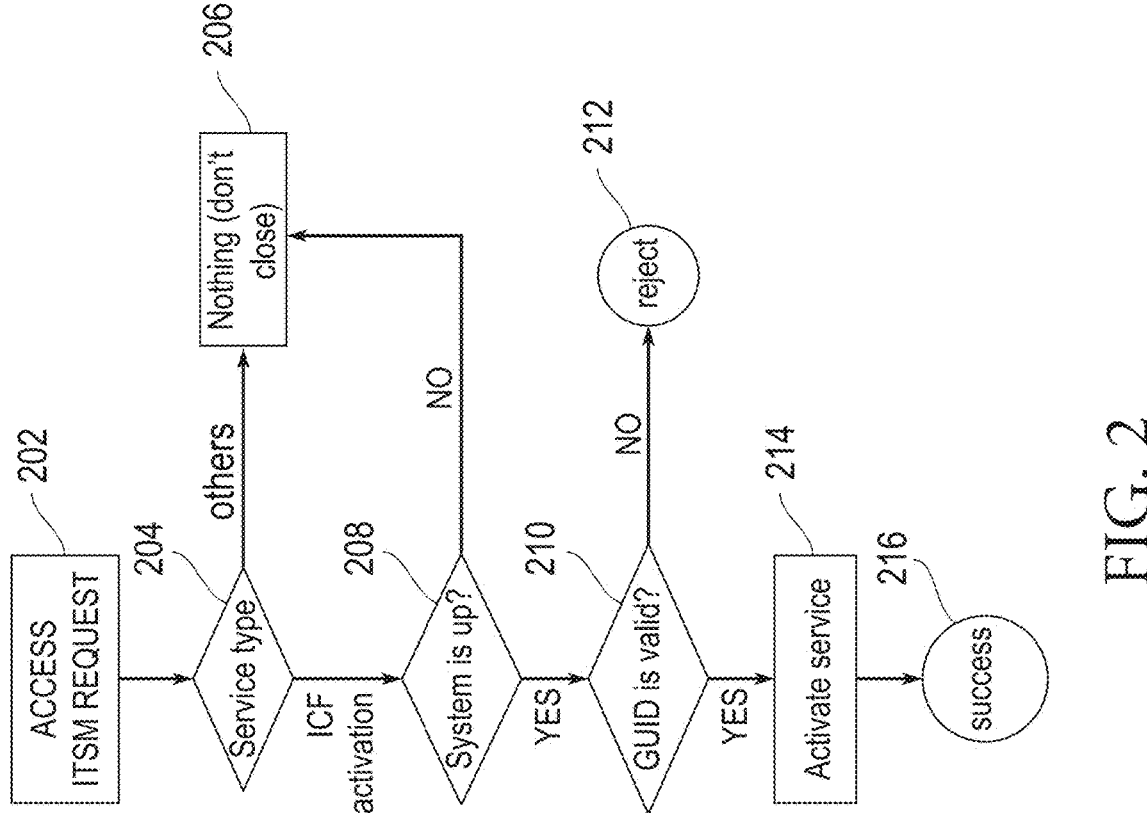
FIG. 2

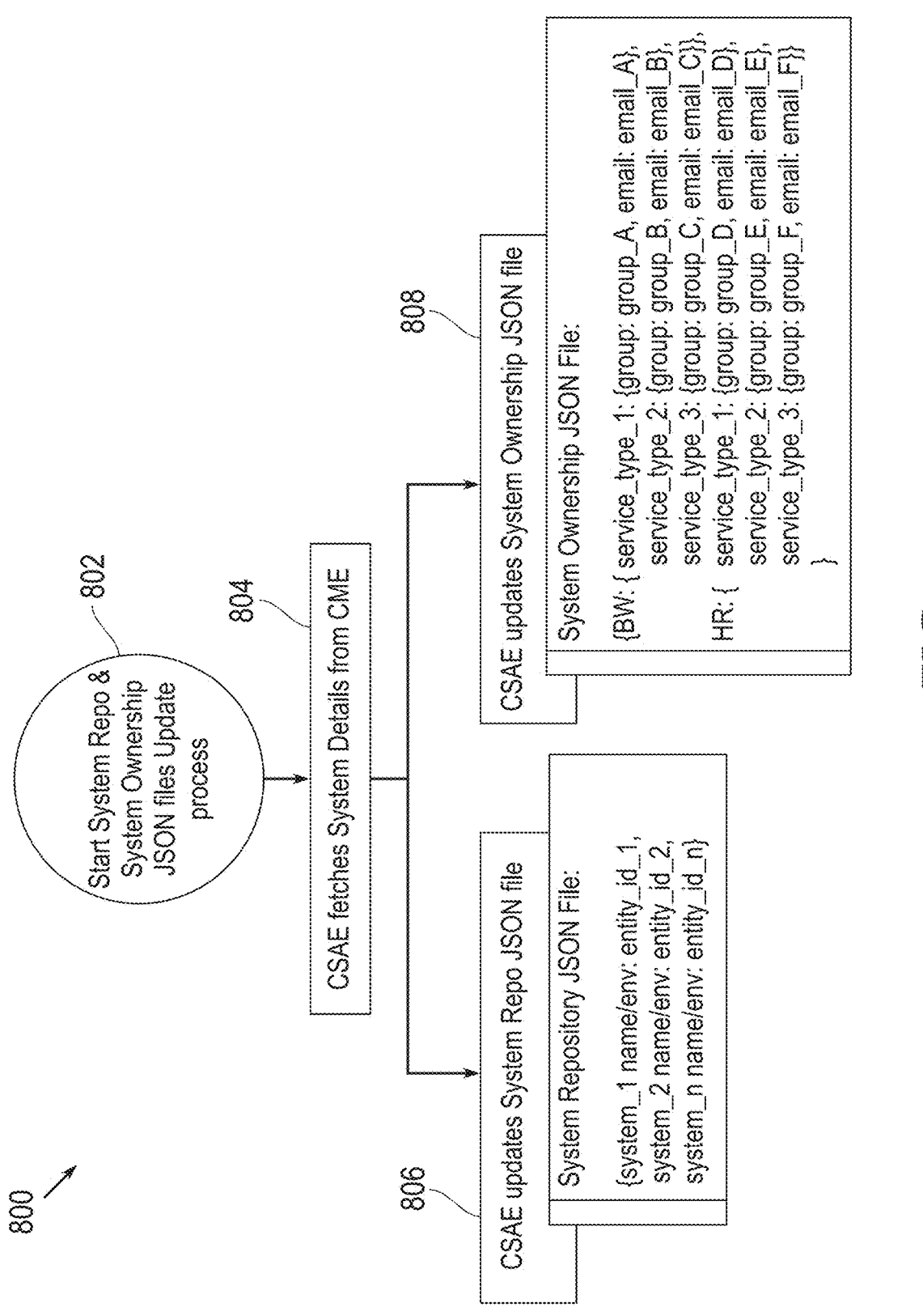

800

802
Start System Repo &
System Ownership
JSON files Update
process

804
CSAE fetches System Details from CME

808
CSAE updates System Ownership JSON file

System Ownership JSON File:

{BW: { service_type_1: {group: group_A, email: email_A},
service_type_2: {group: group_B, email: email_B},
service_type_3: {group: group_C, email: email_C}},
service_type_1: {group: group_D, email: email_D},
service_type_2: {group: group_E, email: email_E},
service_type_3: {group: group_F, email: email_F}}
HR: {
}

806
CSAE updates System Repo JSON file

System Repository JSON File:

{system_1 name/env: entity_id_1,
system_2 name/env: entity_id_2,
system_n name/env: entity_id_n}

FIG. 8

SYSTEM AND METHOD FOR AUTOMATING CONFIGURATION SERVICES IN ENTERPRISE SYSTEMS

FIELD OF THE DISCLOSURE

This patent application relates, generally, to computing platforms and, more particularly, to configuration services in the enterprise.

BACKGROUND OF THE DISCLOSURE

Information technology systems in the enterprise require complex and frequent configuration. Configuring such systems can occur during initial setup as well as in production, often in response to ad-hoc user requests. Such requests include access to custom data and customized data output, such as data reports, data entry graphical user interfaces, or the like. Technical expertise in information technology architectures, platforms, and operations is needed to provide services in response to such requests and maintenance. Unfortunately, service is subject to delay and can be fraught with errors due to lack of expertise, resources, or authorization.

Particularly in the enterprise, information technology systems require complex front-end and back-end security management, further complicating operation processes and customer services. As used herein, a front-end can include one or more interfaces for users to interact with computing devices, and can include graphical screen controls such as buttons, checkboxes, graphics, and text messages. A back-end system, in contrast, regards data and infrastructure that support computing applications. A back-end stores and processes application data and can include complex security-related dynamics of information technology implementations to address known, unknown, and new threats in a variety of enterprise resource planning ("ERP") architectures, platforms, and operations.

It is with respect to these and other concerns that the present disclosure is provided.

SUMMARY OF THE DISCLOSURE

In one or more implementations of the present disclosure, a computer-implemented system and method are provided for information technology service management. At least one computing device configured by executing instructions stored on processor-readable media accesses a plurality of respective information technology service management (ITSM) requests from at least one user computing device. For each one of the plurality of respective ITSM requests, the at least one computing device determines whether the respective ITSM request is valid. Where the request is not valid, the at least one computing device assigns a status identifier representing the respective ITSM request is invalid. Where the request is valid, the at least one computing device identifies, in the respective ITSM request, request information representing at least a request for action associated with a back-end service, a target service name, and a target system. Further, the at least one computing device distinguishes in the respective ITSM request, as a function of at least the request information, a technical infrastructure detail associated with the back-end service. Moreover, the at least one computing device generates, as a function of the technical infrastructure detail, a notification for implementing the action and transmits to at least one computing device associated with the back-end service the notification for implementing the action.

In one or more implementations of the present disclosure, the notification includes instructions to initiate operations associated with the action in a computing device associated with the back-end service, and further wherein the instructions are executed by the computing device associated with the back-end service.

In one or more implementations of the present disclosure, the action includes at least one of an Internet communication framework (ICF) node activation, remote function call creation, remote function call update, and software object importation into a respective production system.

In one or more implementations of the present disclosure, at least one of the respective ITSM requests and at the notification is formatted as a JSON file.

In one or more implementations of the present disclosure, accessing, by the at least one computing device, the plurality of respective ITSM requests further comprises periodically checking for presence of the JSON file, establishing a secure data communication channel to at least one computing device associated with the back-end service, and receiving the one of the respective ITSM requests via the secure data communication channel.

In one or more implementations of the present disclosure, the at least one computing device updates the JSON file with additional information representing at least one of the back-end service, the technical infrastructure detail associated with the back-end service, and the notification.

In one or more implementations of the present disclosure, where the request is valid and for each of the respective ITSM requests, the at least one computing device assigns to the respective ITSM request status information representing an outcome of the respective request is success, pending, or rejected.

In one or more implementations of the present disclosure, assigning the status information is made, by the at least one computing device, as a function of a webservice call to a ITSM system.

In one or more implementations of the present disclosure, the at least one computing device assigns to the respective ITSM request, attribute information representing at least a request identifier and a due date for the respective ITSM request.

In one or more implementations of the present disclosure, where the request is valid and for each of the respective ITSM requests, the at least one computing device assigns to the respective ITSM request a respective landscape information representing a respective category associated with an identified function, wherein the respective landscape information further represents at least one system environment, wherein the target system is reachable as a function of the respective landscape information.

Additional features, advantages, and embodiments of the disclosure may be set forth or apparent from consideration of the detailed description and drawings. It is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 2 illustrates a process flow describing example steps associated with processing and validating information technology management requests, in accordance with one or more implementations of the present disclosure.

FIG. 8 illustrates an example process associated with updating a JSON file including system repository and system ownership information.

DETAILED DESCRIPTION OF THE DISCLOSURE

Figure 1:
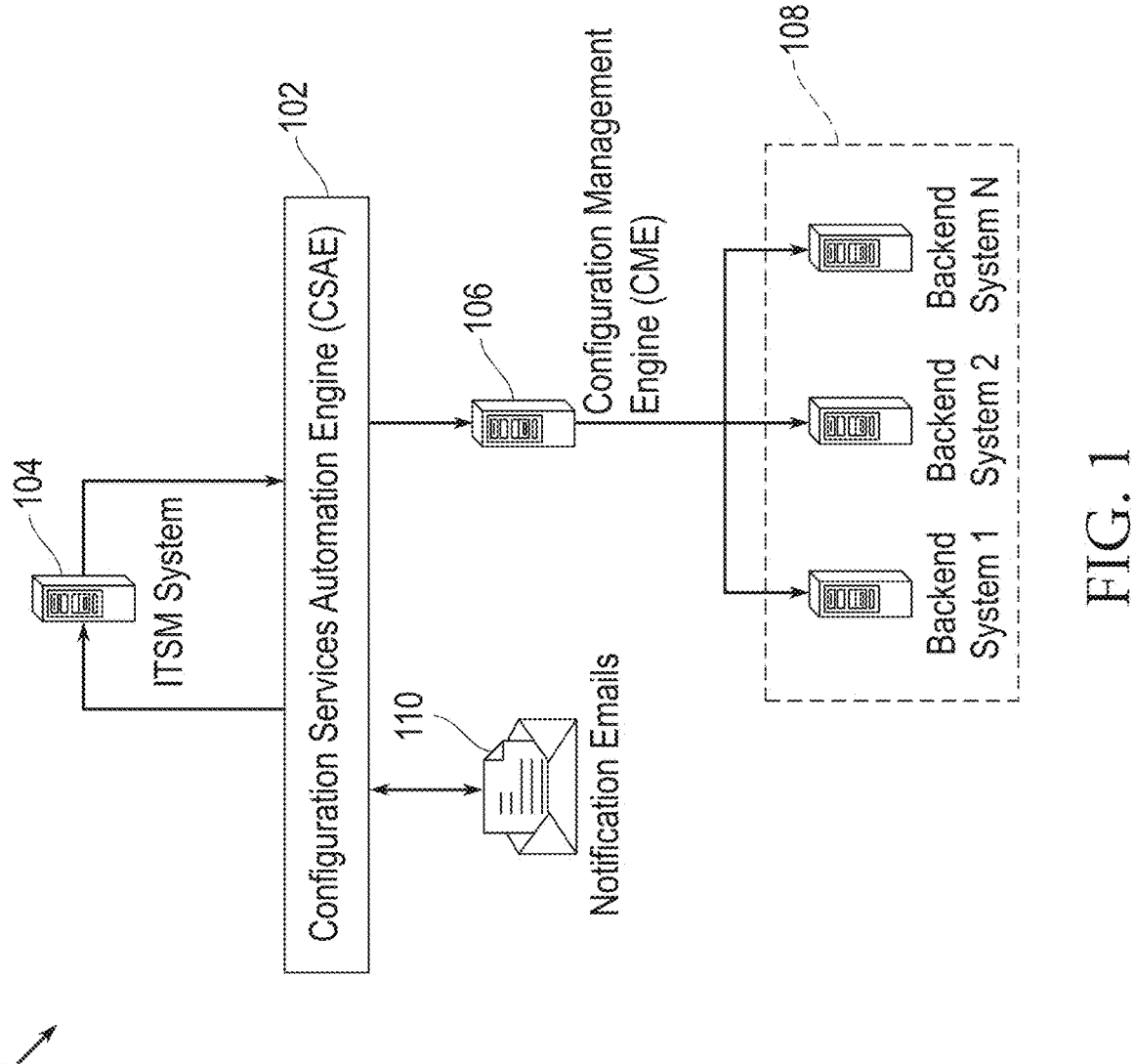
FIG. 1 is a system diagram illustrating an example arrangement of computing devices, including a configuration services automation engine and interactions with respective devices in the arrangement, in accordance with one or more implementations.

By way of overview and introduction, technical method(s) and system(s) are provided that improve and automate configuration and management of information technology and enterprise systems. Features are shown and provided herein for information technology service management ("ITSM"), including technology for provisioning new systems, maintaining existing systems, and for receiving, processing, and responding to customer requests. In addition to improving overall service delivery processes, systems and methods are implemented and maintained for supporting enterprise wide security in and between front-end and back-end systems. Such methods and systems can include one or more respective computing modules which, as used herein, generally refers to a discrete unit of software and/or hardware that can operate in or as various components of a system or method. Modules can operate independently or in combination, including to provide operations shown and described herein.

The present disclosure includes systems and methods for automatic processing of ITSM service requests, and to address related technical challenges in the enterprise. Newly developed front-end and back-end systems can be included that are configured to receive, track, and provide information associated with customer requests. For example, the present disclosure includes technical solutions to limitations associated with front-end systems that are not linked or cannot provide access to information maintained on secure and controlled back-end systems.

One or more implementations of the present disclosure include computing devices that are configured by executing instructions to process information automatically in an integrated environment, which eliminates a need to replace an enterprise's existing front-end or back-end systems. For example, a configuration management engine extends Systems, Applications & Products ("SAP") Landscape Management ("LaMa") with additional capabilities shown and described herein. For example, an improved computer service automation engine ("CSAE") is provided that addresses weaknesses in interactivity between an existing configuration management engine ("CME") and one or more front-end systems. In addition, a secure orchestration is introduced between front-end systems and back-end systems, that would otherwise expose security weaknesses. For example, a front-end system is configured to limit users' ability to modify back-end system configuration settings. This can be implemented by relying on pulling mechanism and integration with a CME to establish secure channels and controlled calls to back-end systems.

A computer service automation engine according to the present disclosure can provide secure communications between an ITSM system and one or more corresponding back-end enterprise systems. Different connection protocols can be enabled by the computer service automation engine, which is configured to utilize webservices and application programming interfaces ("APIs"). In addition, one or more modules can be integrated in a configuration management engine to establish a remote function call to activate a respective service at the end. Accordingly, secure processing of customer requests can occur without a danger of exposing mission critical systems to unauthorized users, such as members of the public.

In one or more implementations of the present disclosure, an enterprise environment configured with an IT Service Management ("ITSM") system is configured to receive and process customer service requests. More particularly, the ITSM system can be configured with one or more controls that enable a customer to select from a range of services offered by a plurality of service providers and which can be implemented against back-end systems. For example, using the controls an end-user can provide input data in specific fields and submit the data, such as in the form of a request. The data can be packaged and transmitted to a respective service provider, enabling the service provider to review, approve, and process the request, for example, via email or other communication platform. Specific services can be provided with enforced control measures and configurations requests can be tracked by a centralized multipurpose ITSM system associated with a customer's front-end. Such services can include, for example, Internet Communication Framework ("ICF") node activation, remote function call creation or update, and software object importation into a respective production system.

The present disclosure overcomes shortcomings associated with a service provider analyst having to manually configure an ITSM inbox of a service provider, such as by reviewing data in request fields, performing authentication in a target back-end system using a privileged configuration account, configuring the change, and closing the request. The service typically is subject to contractual provisions, such as a service level agreement ("SLA") entered into between customers and service providers.

In one or more implementations of the present disclosure, different types of services can be requested by customers using an ITSM system. Each type of service can have a plurality of parameters and associated values and be assigned a respective identification. For example, an end-user completes an ITSM request by assigning values to the parameters, such as via selections from menu items, check boxes, radio buttons, free-text typing, or by uploading one or more attachments (e.g., spreadsheet, document, image, audio, video, or other file format). Additionally, one or more attributes or values can be automatically assigned, such as relating to the end-user's organization.

Moreover, a configuration services automation engine ("CSAE") can be configured to communicate with an ITSM system to determine periodically whether ITSM requests are pending, such as in a processing inbox. Each ITSM request submitted, for example, by a customer can be assigned a unique identifier.

The CSAE can be configured by executing instructions stored on non-transitory processor readable media to establish a secure HTTP webservice call and to pull open ITSM requests of specific service types using a system account with pre-assigned authorization. Requests of a specific service type can be retrieved by passing a value associated with a service type identifier (e.g., Service Type ID) as part of the webservice call. For example, each service type can be is associated with a JSON structure, and retrieved open requests can be stored in JSON format. Each request can be assigned a unique ID once submitted by the customer, and the CSAE identifies one or more relevant back-end systems, for example, based on request parameters, which are used to communicate with a configuration management engine ("CME"), e.g., SAP LaMa, by calling a secure application programming interface ("API") and passes system details.

Referring now to the drawings, FIG. 1 is a system diagram illustrating an example arrangement of computing devices 100, including a configuration services automation engine 102 and interactions with respective devices in the arrangement 100. CSAE 102 can support standalone or highly available backend systems 108, including via CME 106. CSAE 102 can communicate with ITSM system 104 to fetch, update, and close requests, as well as to send notification emails to service teams for pending requests.

In an implementation including system 100, pending ITSM requests can be validated. Configuration management engine 106 can be configured by executing instructions stored on processor-readable media (including, but not limited to, non-transitory processor readable media) to validate readiness of one or more target managed systems and specific configuration attributes. The statuses of the relevant systems can be communicated back to CSAE 102. Attributes of respective requests, including specific service types, are further validated. For example, in case of ICF service activation request type, an ICF node is validated by checking whether the node exists in the backend system. Requests associated with available systems and valid requests can be processed, for example, by sending required action to CME 106 through API calls that passes parameters associated with the request including the system name, environment and configuration parameters.

In an embodiment of this invention, a module in CME 106 establishes a remote function call to a target system to perform configuration operations. In response, as configuration result can be returned to CME 106 by one or more respective backend systems 108, which is transmitted by CME 106 to CSAE 102 during, for example, a respective data communication session established in response to the API call. In one or more implementations, a JSON object that includes an item representing the relevant request can be updated based on the returned status. The CSAE 102 can further establish a webservice call to a calling ITSM system, for example, to assign a respective status identifier (e.g., "success," "pending," or "rejected") to a respective ITSM request.

Referring now to FIG. 2, a process flow 200 is illustrated and describing steps associated with processing and validating ITSM requests. The process 200 can be performed by a processor executing instructions in a computer-readable storage medium, for example via at least CSAE 102. It is to be appreciated that several of the logical operations described herein are implemented as a sequence of computer-implemented acts or program modules running on one or more computing devices. Accordingly, the logical operations described herein are referred to variously as operations, steps, structural devices, acts and modules can be implemented in software, in firmware, in special purpose digital logic, and any combination thereof. It is also to be appreciated that more or fewer operations can be performed than shown in the figures and described herein. Machine learning operations can be implemented, for example, using neural networks, which can be implemented on traditional computing systems as well as emerging neuromorphic systems. Furthermore, these operations can be performed in a different order than those described herein.

Continuing with reference to FIG. 2, CSAE 102 can access a respective ITSM request. For example, at step 202 an ITSM request is accessed, and a determination made at step 204 whether the service type includes an ICF activation. If the determination at step 204 is the service type is other than ICF activation, then the process branches to step 206 and no further action is taken and the request is not closed. Alternatively, if the result of the determination at step 206 is that the request is for ICF activation, then the process branches to step 208 and a determination is made whether the system is operational (e.g., the system is "up"). If the determination at step 208 is negative, then the process branches back to step 206. In one or more implementations of the present disclosure, system unavailability during the processing time results in the ITSM request not being closed, and stored in a JSON file for future pending requests. CSAE can further comprise an alert engine for unprocessed pending requests by checking pending requests JSON file. Alternatively, if the determination at step 208 is affirmative, then the process branches to step 210 and a determination is made whether a GUID has been assigned. For example, the GUID can be an assigned attribute representing a unique identifier of an ICF node to be configured as part of this request. If the determination at step 210 is negative, then the process branches to step 212 and the request can be closed and automatically assigned a status value representing "rejected." Alternatively, if the determination at step 210 is affirmative, then the process branches to step 214 and the service can be automatically activated. Accordingly, in one or more implementations of the present disclosure open requests are validated and can represent ITSM Service requests that are in the inbox of the service team but not closed and assigned a "success" or "rejected" status. Statuses, such as success, pending or rejected, can be associated with ITSM requests. Any attempt to close ITSM and apply a status of "success or rejected" can be initiated by CSAE 102, for example, through webservice calls. CSAE 102 can attempt to process pending requests in subsequent runs in addition to new open requests. Pending requests can be preserved for further processing by one or more respective modules of CSAE 102. Notifications can be triggered at regular intervals, for example, to check requests that are represented in a pending requests JSON file that had been validated but not processed, in order to provide a notification to take necessary actions if required, for example, in advanced of an SLA breach.

Figure 3:
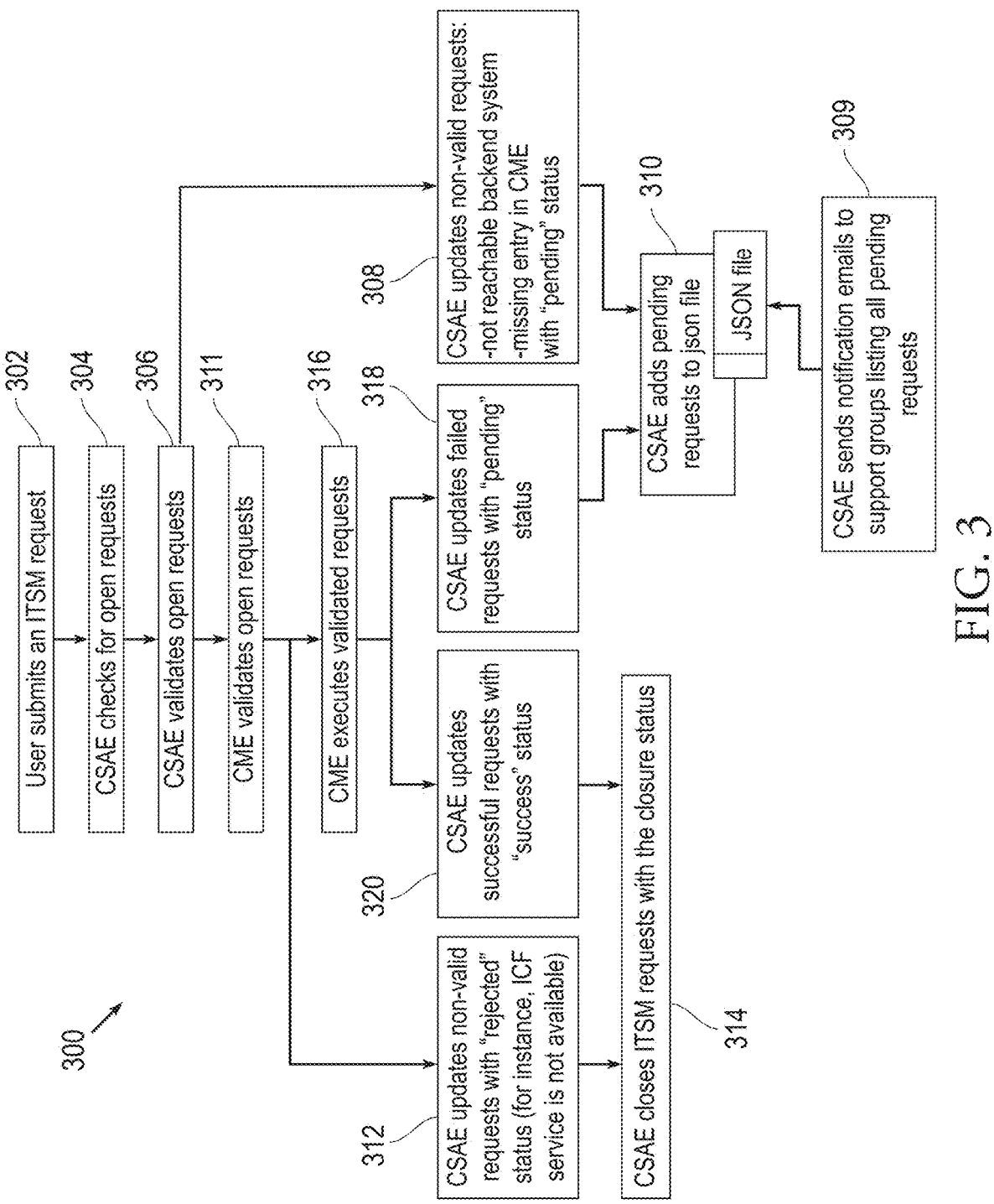
FIG. 3 illustrates an example process flow, including steps associated with a computer service automation engine processing open requests, in accordance with one or more implementations of the present disclosure.

Accordingly, one or more implementations of the present disclosure include computing devices that ITSM requests can undergo an approval process. The request in this process is either approved or rejected. If it is approved, ITSM request status can be updated to "Open," which enables CSAE 102 to retrieve and process the ITSM request. FIG. 3 illustrates an example process flow including steps 300 associated with CSAE 102 processing open requests. In the example shown in FIG. 3, at step 302 a user submits an ITSM request. Concurrently, or thereafter, CSAE 102 checks for open requests, such as via a file daemon or other suitable technology (step 304). In one or more implementations of the present disclosure, CSAE 102 establishes a webservice call against ITSM System 104. The call returns an XML payload, which is converted to a JSON object. If there is no open request, the XML payload will be empty, indicating no open request. Otherwise, all open requests are sent in the payload, including its attributes. At step 306, CSAE 102 validates open requests, and non-valid requests are updated via step 308, in which non-valid requests are updated with information representing the request as pending, such as due to a respective back-end system being not reachable or that an entry is missing in the configuration management engine 106. Thereafter, at step 310, the CSAE 102 adds pending requests to a respective JSON file, and CSAE 102 can send one or more notification emails listing all pending requests (step 309).

Continuing with reference to the process flow shown in FIG. 3, at step 308, configuration management engine 106 validates open requests (step 311). Non-valid requests can be updated by CSAE 102 with a "rejected" status when, for example, an ICF node service is not available, in the event the ICF node service is not available in the backend system, or if an ICF node service is blacklisted, for example, due to security or operational reasons (step 312). Thereafter, at step 314, CSAE 102 can close the ITSM request with the applied closure status. At step 316 CME 106 executes validated requests. At step 318, CSAE 102 updates failed requests with "pending" status, and adds pending requests to a JSON file (step 310). At step 320, CSAE 102 updates the status of successful requests to "success." Thereafter, the process continues to step 314 and the CSAE 102 closes the ITSM request.

Figure 4:
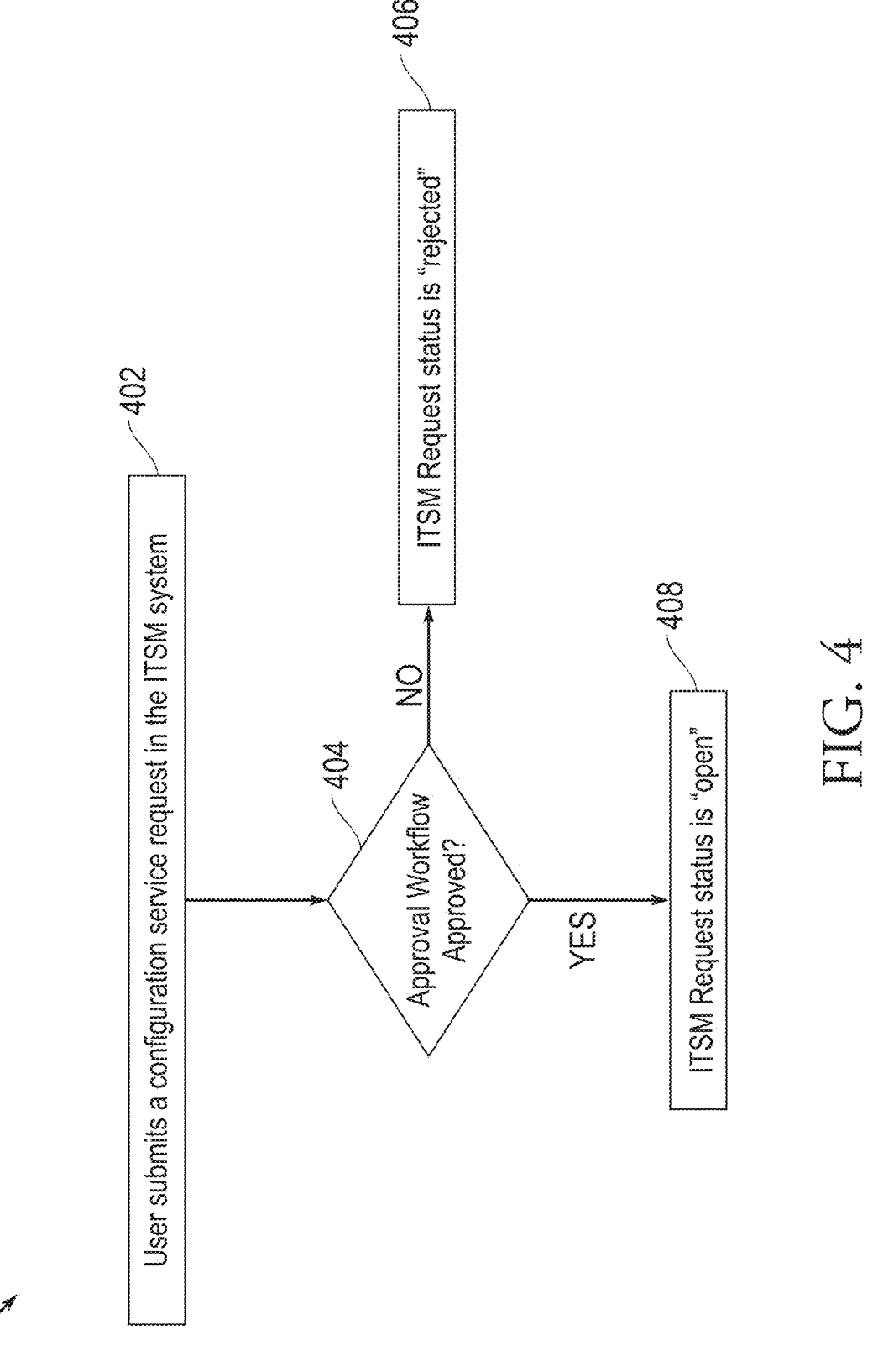
FIG. 4 illustrates an example process flow, including steps associated with a computer service automation engine performing request approval processes, in accordance with one or more implementations of the present disclosure.

Accordingly, ITSM requests are subject to approval processes, which can be either approved or rejected. If approved, the status of an ITSM request can be updated to "Open," and thereafter subject to retrieval and processing by CSAE 102. For example, as illustrated in the example process flow shown in FIG. 4, at step 402 a configuration service request is submitted. At step 404, a determination is made whether the workflow is approved. If not, the process branches to step 406 and the ITSM request status is set to "rejected." Otherwise, the process branches to step 408 and the ITSM request status is set to "open."

Figure 5:
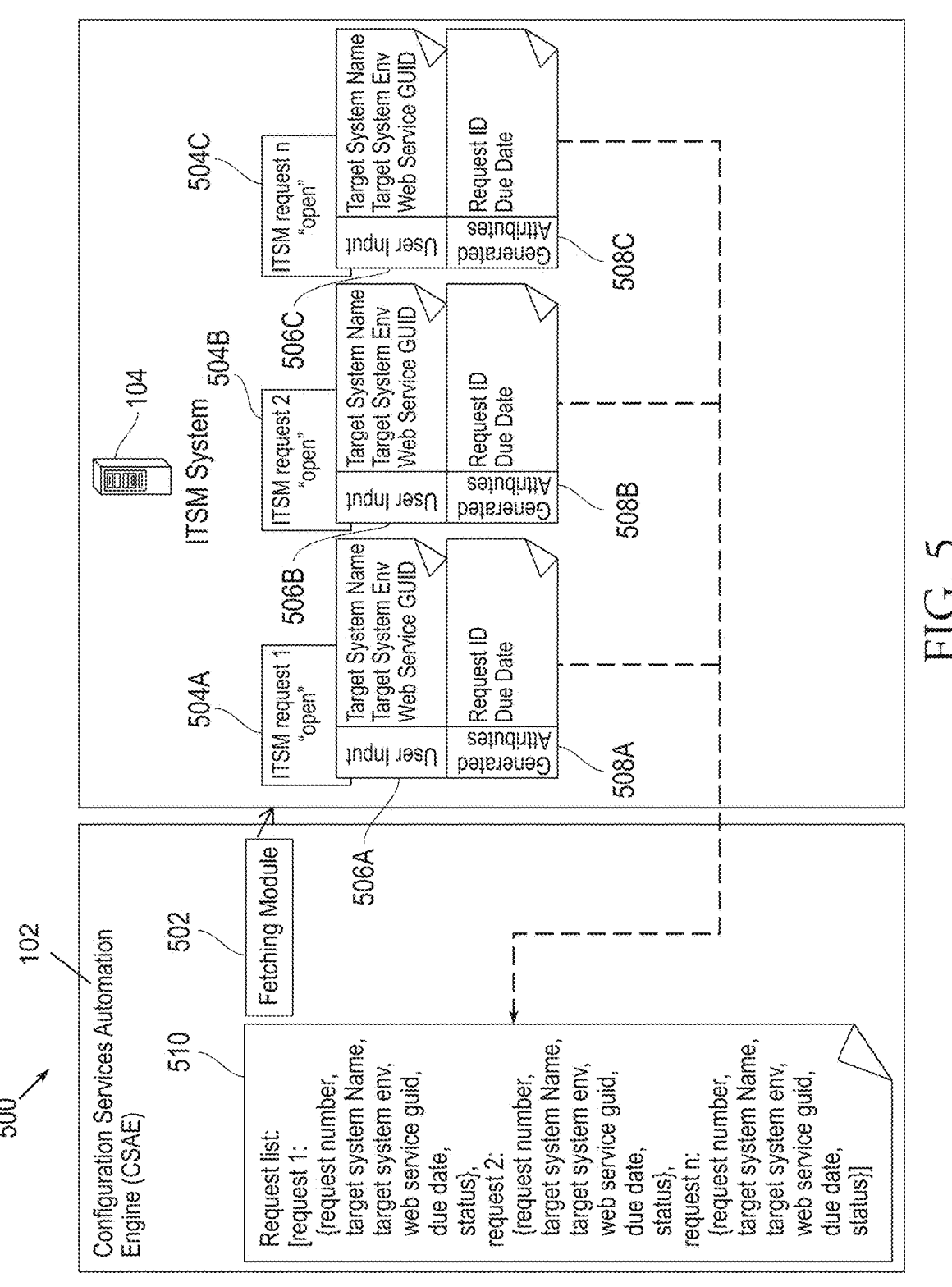
FIG. 5 depicts components associated with communication between a computer service automation engine and an information technology system, in accordance with one or more implementations of the present disclosure.

FIG. 5 depicts components 500 associated with communication between CSAE 102 and an ITSM system 104. A fetching module 502 configured with CSAE 102 can communicate with an ITSM system 104 to read open requests (e.g., ITMS request 504A, 504B, and 504C. Each request 504A, 504B, and 504C has a number of attributes that can represent user inputs, and a number of attributes that can represent system generated data. In one or more implementations, a fetched list of requests is written into JSON format object(s) in CSAE 102. In addition to the attributes in an ITSM request retrieved from an ITSM system 104, CSAE 102 can include a status field representing the current processing status in CSAE 102.

For example, and as further illustrated in FIG. 5, user input attributes 506A, 506B and 506C, as well as system generated attributes 508A, 508B, and 508C can be provided with or for a respective ICF activation request type. As illustrated in FIG. 5 Target System Name represents a respective category of applications, such as defined by function and referred to herein, generally, as a "landscape." System 100 can support a plurality of landscapes and landscape types. For example, implementations of the present disclosure can include processing simultaneously a human resource landscape, a finance, a business warehouse landscape, an information technology landscape. Landscapes can include multiple system environments, including development, quality assurance ("QA"), and production. In operation, a target system is reached by its landscape and environment attributes, which eliminates a need for a customer to provide technical or confidential infrastructure details, such as Internet Protocol address, hostname, port number, or other technical information associated with a target system. Technology is provided herein for infrastructure aspects of a target backend system that are mapped to landscapes and environments, such as in a JSON file accessible by CSAE 102. Moreover, a service GUID attribute, as noted herein representing a unique ID of an ICF node, can be automatically configured with a respective request. Each open ITSM request can be assigned a unique ID and a due date automatically, such as by ITSM system 104. As illustrated in FIG. 5, example request 510 retrieved via fetch module 502 can include a list of a plurality of respective requests, each including attributes and values, such as representing a request number, target system name, environment, a webservice GUID, due date, and status.

Figure 6:
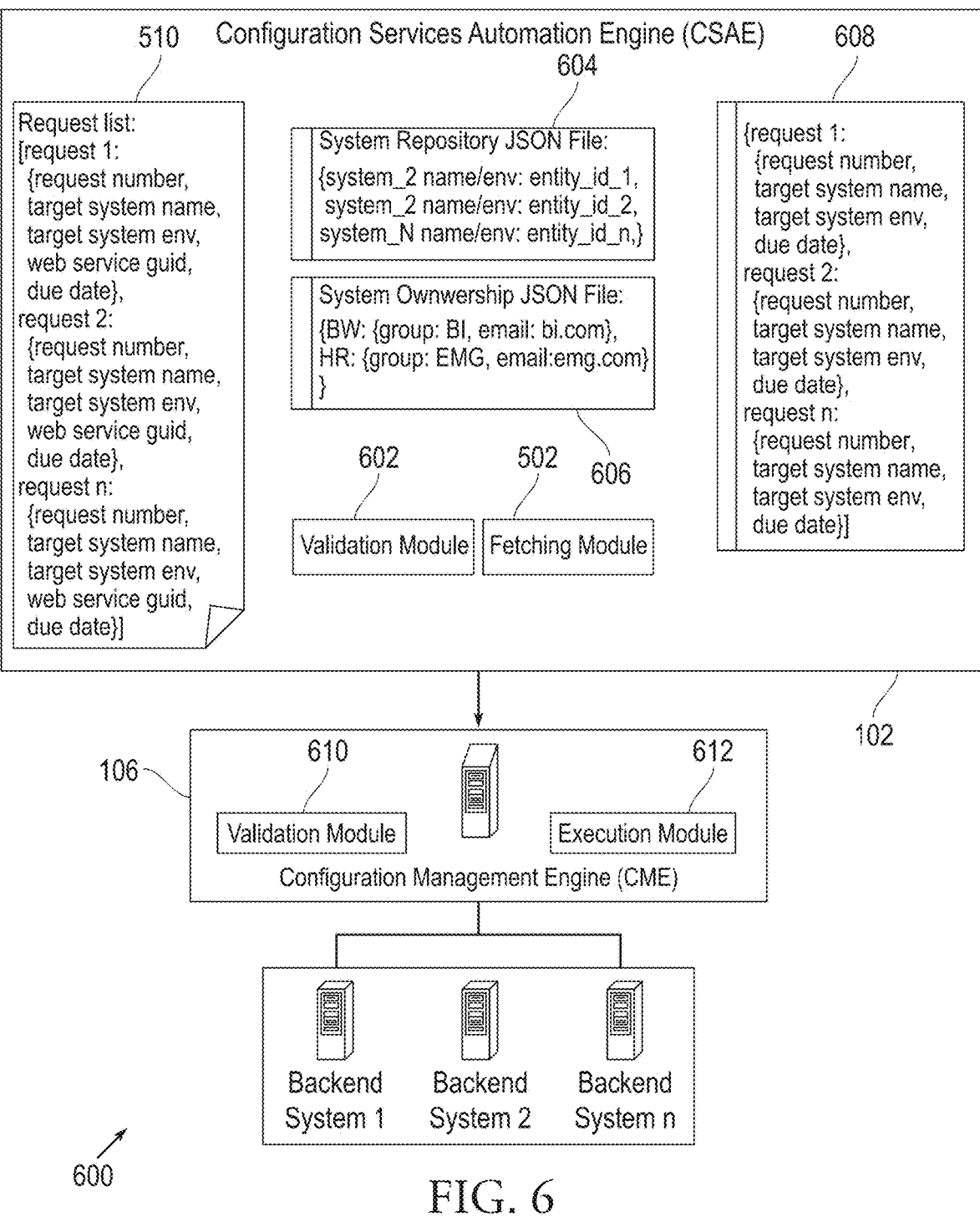
FIG. 6 depicts example components in connection with communication between a computer service automation engine, an information technology system, and a management engine, in accordance with one or more implementations of the present disclosure.

Turning to FIG. 6, example components 600 are illustrated in connection with communication between CSAE, CME, and backend systems. In addition to JSON objects representing open ITSM requests, CSAE 102 can be configured by executing instructions to store and maintain current information, for example, representing back-end systems, systems' service teams, and pending ITSM requests, and outcomes. CSAE 102 can be configured to initiate API or webservice calls via validation module 602 and fetching module 502 to CME 106 and ITSM 104, for example, as a function of system repository information 604, system ownership information 606, pending requests information 608 and open request list information (e.g., request 510). Open requests, generally, refer to requests in ITSM 104 that were not processed/checked previously. Pending requests, generally, refer to requests that were fetched previously, but not yet processed by CSAE 102. These calls can initiate relevant operations in CME 106 that trigger validation and execution calls against backend systems (e.g., validation module 610 and execution module 612). In operation, CSAE 102 can act as an orchestrator, including by orchestrating ITSM requests and the processing thereof as a function of established connection channels between ITSM system and backend systems via CME 106.

Figure 7:
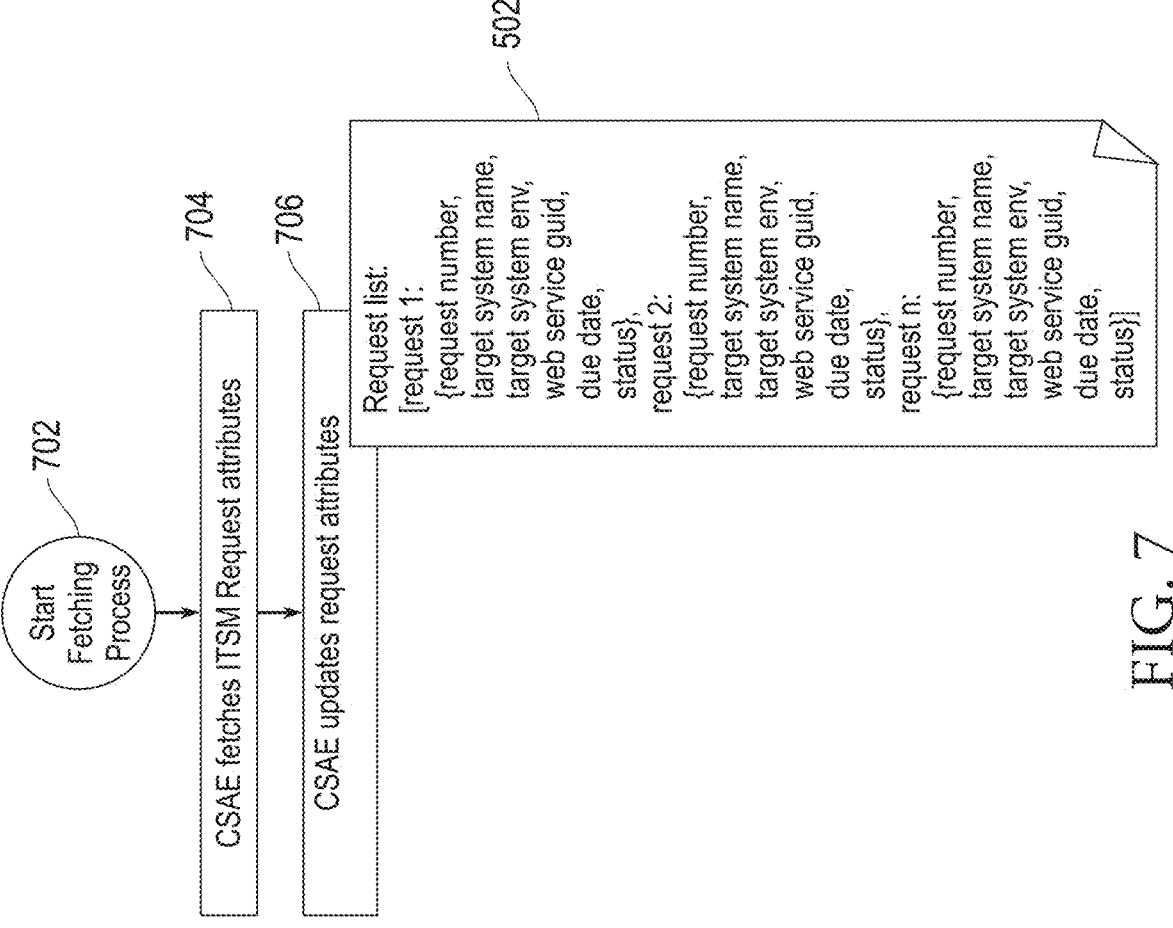
FIG. 7 illustrates an example process associated with fetching, in accordance with an example implementation of the present disclosure.

FIG. 7 illustrates an example process associated with fetching in accordance with an example implementation of the present disclosure. As shown in FIG. 7, fetching module 502 executing via CSAE 102 periodically (e.g., regularly) starts a fetching process (step 702). More particularly, open ITSM request attributes are accessed ("fetched") at step 704. At step 706, CSAE 102 updates request attributes, including with information representing specific service type from an ITSM system 104. It updates a list of JSON format object items with attributes of all open requests including their request numbers.

FIG. 8 illustrates an example process associated with updating a JSON file including system repository and system ownership information. In one or more implementations of the present disclosure, the process starts at step 802, and at step 804 a fetching module (e.g., module 502 or other independent module) executing via CSAE 102 periodically executes to fetch system details from configuration management engine 104. At step 806, CSAE 102 updates a JASON format file with information in a list of systems and respective entity IDs that can be recognized by CME 106. In an embodiment of this invention, CME 106 can contain and automatically process a repository of all systems under the scope of ITSM service requests. For example, CME 106 scans a data communication network for newly discovered devices or systems. System attributes, such as service team, service team contact, system landscape and environments, can be discovered and information associated therewith can be updated. In an example operation, CSAE 102 updates a respective JSON file with information representing system ownership, as well as a respective JSON file representing a system repository, by fetching the recent updates from CME 106, such as via API calls.

In one or more implementations of the present disclosure, a system repository JSON file is particularly useful for mapping a list of system landscape and environments, such as provided by an ITSM system 104 to the systems as defined in CME 106. Each managed system in CME 106 can be assigned a unique ID. To establish API calls to CME against a specifically managed system, a system ID can be provided as part of an API call along with the requested operation and configuration details. The features shown and described herein, including the example process shown in FIG. 8, can effectively translate a representation of an ITSM system 104 to a system representation of CME 106. Furthermore, a value, "system_n_name/env," can be fetched from the ITSM request as part of ITSM request processing. In the event that a mapping is missing, a notification can be automatically generated and sent to CSAE 102 and/or CME 106, including to represent possible new landscape and new environments in CME 106. After determining that the new landscape and environments are valid, the new landscape and environment can be added as attributes in CME 106, for that specific system. Subsequent fetches of a system repository from CME 106 can be used to update a system repository JSON file (or other suitable file or data format) in CSAE 102.

Information representing system ownership can be accessed via CSAE 102 from CME 106. Information representing service team(s) and contact details can be provided by CME 106, for each respective system landscape. In such case, mapping can be based on each respective system landscape name. One of ordinary skill will recognize that a service team can cover various service types in many different systems or subsets of systems. Each can be represented, for example, in a service team JSON file.

Figure 9:
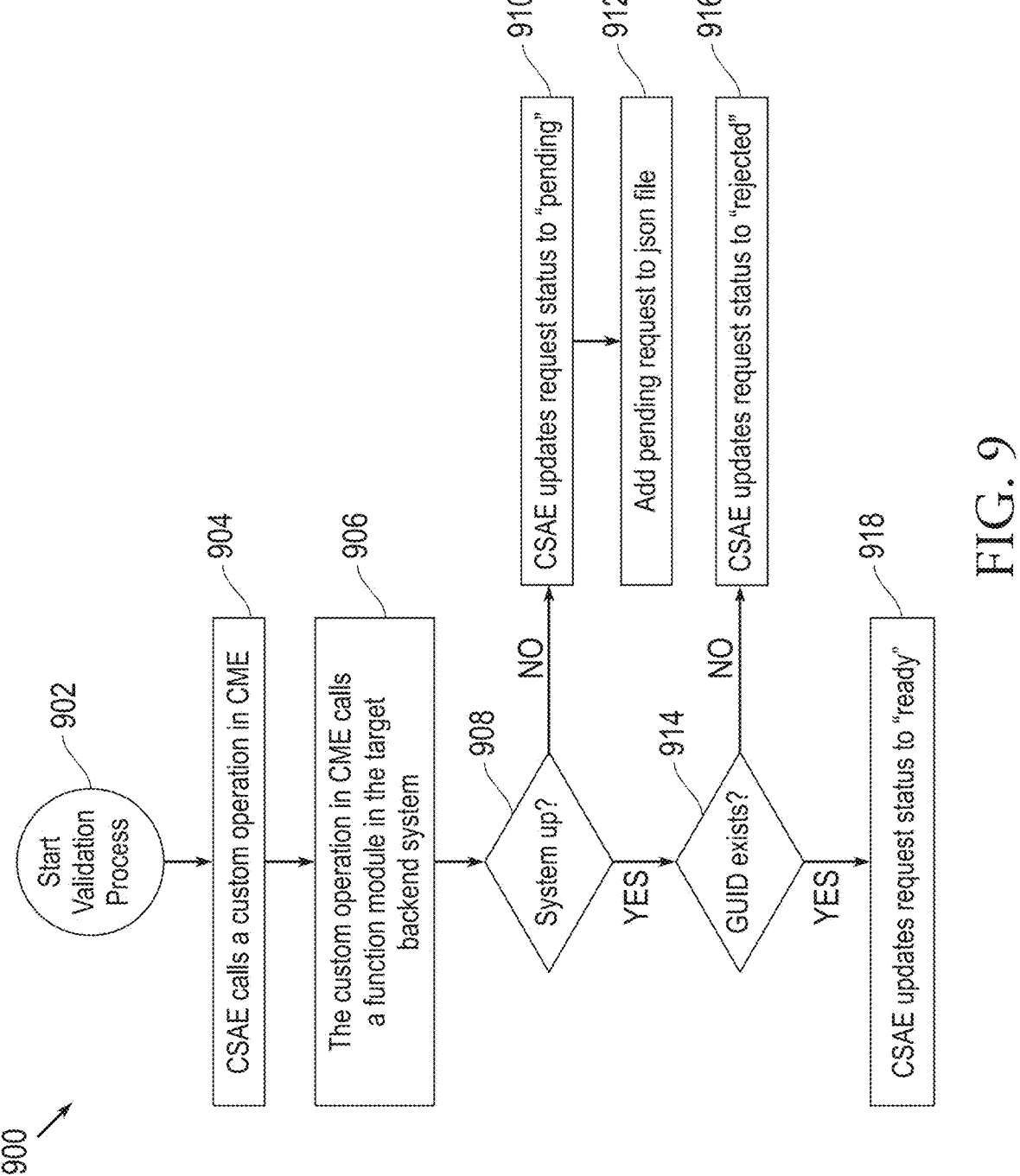
FIG. 9 represents steps associated with an example a validation process, in accordance with an example implementation of the present disclosure.

FIG. 9 represents steps associated with an example a validation process, in which validation module 602 in CSAE 102 can start a validation process (step 902) in which CSAE 102 can be configured to call a custom operation in CME 106 (step 904). Such custom operation calls can include a web service operating to obtain status of the instance of a respective target back-end system (step 906). At step 908, a determination is made whether the target back-end system is active ("up"). If the determination at step 910 is negative and the system is deemed offline, the process branches to step 910, and CSAE 102 updates the request item with information representing a "pending" status and the item is added into a JSON format file (step 912). The teachings herein support highly available systems with distributed application servers. For example, if at least one application server is available to support a service, the system can be identified (e.g., marked) as online. Alternatively, if the determination at step 908 is affirmative, then the process branches to step 914. If the system is online, for ICF service activation/deactivation case, it validates if the provided web service GUID exists in the target backend system by calling a function module using a remote function call, in one or more implementations. If it does not exist, the process branches to step 916 and the request JSON's item in CSAE is updated with "rejected" status. If it exists, the request JSON's item in CSAE is updated with "ready" status (step 918).

Figure 10:
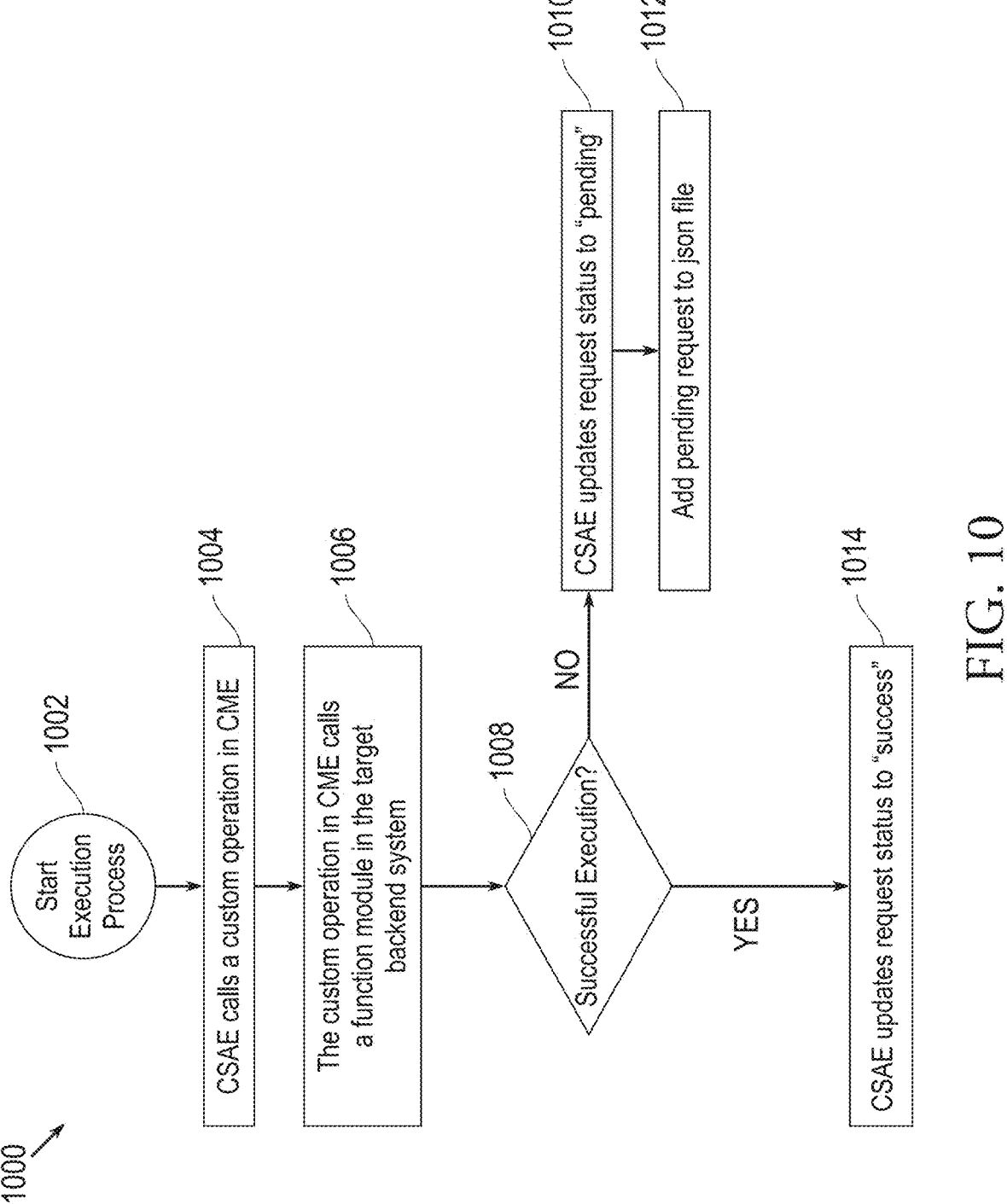
FIG. 10 illustrates an example process flow including steps associated with an execution process.

FIG. 10 illustrates an example process flow including steps 1000 associated with an execution process. At step 1002, the process starts and, thereafter, an execution module in CSAE 102 establishes an API call to a custom operation in CME 106 (step 1004). At step 1006, the custom operation calls a function module in the target backend system using, for example, a remote function call. Thereafter, a determination is made at step 1008 whether the execution is successful. If the result of the determination at step 1008 is negative, then the process branches to step 1010 and CSAE 102 updates a request JSON's item with a "pending" status, and the item is added into Pending Requests JSON format file presented (step 1012) (see, for example, FIG. 6. Alternatively, if the determination in step 1008 is that the execution is successful, the request JSON's item in CSAE is updated with "success" status (step 1014).

Figure 11:
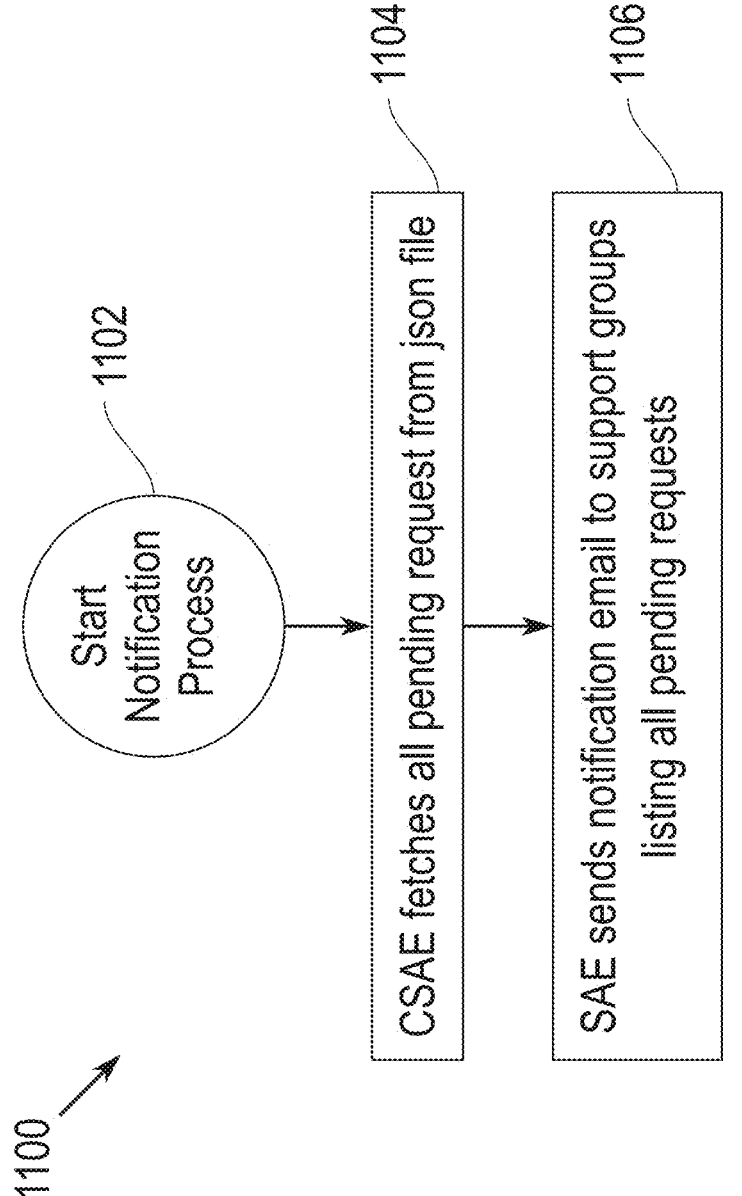
FIG. 11 illustrates a simple process flow associated with generating and transmitting a notification process, in accordance with one or more example implementations of the present disclosure.

FIG. 11 illustrates a simple process flow associated with generating and transmitting a notification process, in accordance with one or more example implementations of the present disclosure. A notification generation and transmission process in accordance with the present disclosure can support multiple service teams. For example, in specific environments back-end systems can be grouped on various data elements, such as based on customers types, and the groups can be supported by different support teams. FIG. 11 illustrates steps associated with an example of the notification process. At step 1104, CSAE 102 fetches pending requests from a JSON format file, in which pending request items have been updated with associated service team names and emails. At step 1106, CSAE 102 generates and transmits a notification email to each service team listing their associated pending requests that were not processed success-fully. In operation, the data in JSON file can be used to trigger incident using (Information Technology Service Management (ITSM)) system through API calls.

Accordingly, as shown and described herein, a plurality of modules can be implemented in a Configuration Services Automation Engine 102, which enables orchestrating interactions with an ITSM system 104 and configuration management engine (CME) 106. Modules can be included that operate to activate ICF services in back-end systems in addition to developing the notification module in CSAE. Service Automation is improved as a function of the present disclosure, including for interaction with respective back-end systems, including calls between CSAE 102 and a respective configuration management engine 106. The present disclosure includes systems and methods to activate webservices in a back-end system automatically, upon receiving an ITSM request for service activation as a function of the present disclosure.

In one or more implementations, an integration layer can be provided that includes an automation engine that orchestrates processing and communication with a configuration management engine 106. Respective platform and software requests can be managed against enterprise systems, as the present disclosure is not limited to merely infrastructure request fulfillment. A transformation of manual processing of requests to an improved technological architecture is provided for end-to-end automation. Moreover, features of the present disclosure ensure secure processing of requests, for example, as front end system(s) (e.g., via a portal or ITSM) are not provided direct or indirect access to a remote infrastructure or a platform administration. This provides for secure and effectively anonymous processing of requests from respective front-ends via an automation engine. This precludes a back-end infrastructure or platform from exposed to the public. In implementations, the engine can be hosted in a different platform or zone to achieve further security and control over critical back-end components.

It is to be appreciated that organizations with established ERP back-end systems are provided value as a function of the technology shown and described herein. Proprietors of the present disclosure offering SaaS cloud services and seeking to enhance and secure services and avail self-services to customers can benefit by the teachings herein. Automatic configuration based on service requests submitted through a front-end system can be provided, and ICF activation can be included, thereby extending to various kinds of enterprise services involving a front-end customer portal and secured back-end systems. Accordingly, systems and methods are provided to automate processing of ITSM requests with minimal processing time. The present disclosure supports secure processing of ITSM requests while controlling the exposure layer between front-end systems and back-end systems.

Figure 12:
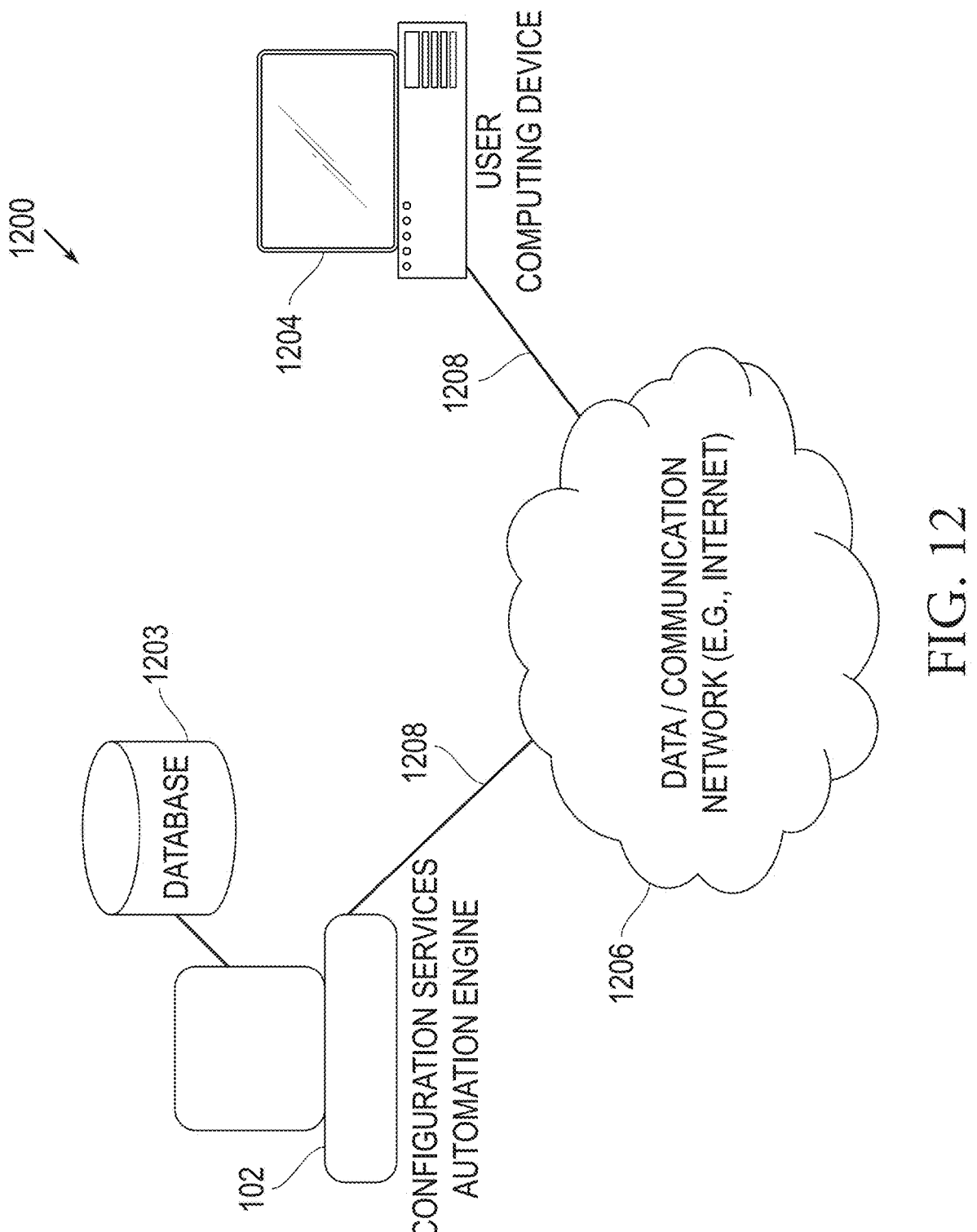
FIG. 12 is a block diagram that shows an example hardware arrangement that operates for providing the systems and methods disclosed herein.

Referring to FIG. 12, a diagram is provided that shows an example hardware arrangement that operates for providing the systems and methods disclosed herein and designated generally as system 1200. System 1200 can include one or more CSAE 102 that are at least communicatively coupled to one or more user computing devices 1204 across communication network 1206. CSAE 102 and user computing devices 1204 can include, for example, mobile computing devices such as tablet computing devices, smartphones, personal digital assistants or the like, as well as laptop computers and/or desktop computers, server computers and mainframe computers. Further, one computing device may be configured as CSAE 102 and a user computing device 1204, depending upon operations being executed at a particular time.

With continued reference to FIG. 12, CSAE 102 can be configured to access one or more databases 1203 for the present disclosure, including source code repositories and other information. However, it is contemplated that CSAE 102 can access any required databases via communication network 1206 or any other communication network to which CSAE 102 has access. CSAE 102 can communicate with devices comprising databases using any known communication method, including a direct serial, parallel, universal serial bus ("USB") interface, or via a local or wide area network.

User computing devices 1204 can communicate with CSAE 102 using data connections 1208, which are respectively coupled to communication network 1206. Communication network 1206 can be any communication network, but typically is or includes the Internet or other computer network. Data connections 1208 can be any known arrangement for accessing communication network 1206, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 1204 preferably have the ability to send and receive data across communication network 1206, and can be equipped with web browsers, software disclosures, or other means, to provide received data on display devices incorporated therewith. By way of example, user computing device 1204 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 1206, and that wireless communication can be provided between wireless devices and CSAE 102.

System 1200 preferably includes software that provides functionality described in greater detail herein, and preferably resides on one or more CSAE 102 and/or user computing devices 1204. One of the functions performed by CSAE 102 is that of operating as a web server and/or a web site host. CSAE 102 typically communicate with communication network 1206 across a permanent i.e., un-switched data connection 1208. Permanent connectivity ensures that access to CSAE 102 is always available.

Figure 13:
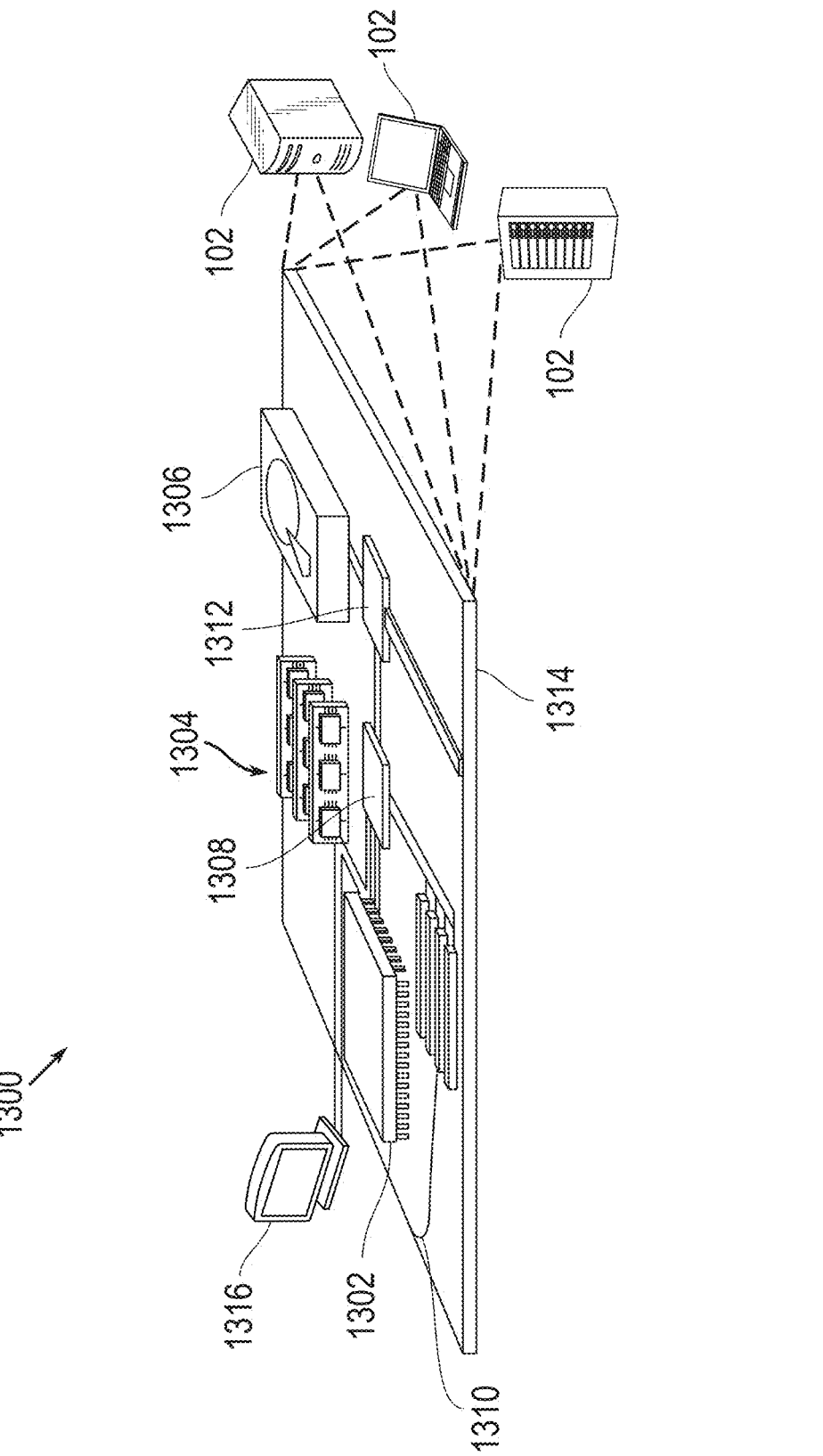
FIG. 13 shows an example of a computing service automation engine that can be used to implement the techniques described herein the present disclosure.

FIG. 13 shows an example CSAE 102 that can be used to implement the techniques described herein. The CSAE 102 is intended to represent various forms of digital computers, such as laptops, desktops, workstations, personal digital assistants, servers, blade servers, mainframes, and other appropriate computers. The components shown in FIG. 13, including connections and relationships, and their functions, are meant to be exemplary only, and are not meant to limit implementations of the inventions described and/or claimed in this document.

The CSAE 102 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and can be mounted on a common motherboard or in other manners as appropriate. The processor 1302 can process instructions for execution within CSAE 102, including instructions stored in the memory 1304 or on the storage device 1306 to display graphical information for a GUI on an external input/output device, such as a display 1316 coupled to the high-speed interface 1308. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1304 stores information within CSAE 102. In some implementations, the memory 1304 is a volatile memory unit or units. In some implementations, the memory 1304 is a non-volatile memory unit or units. The memory 1304 can also be another form of computer-readable medium, such as a magnetic or optical disk.

The storage device 1306 is capable of providing mass storage for CSAE 102. In some implementations, the storage device 1306 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1304, the storage device 1306, or memory on the processor 1302.

The high-speed interface 1308 can be configured to manage bandwidth-intensive operations, while the low-speed interface 1312 can be configured to manage lower bandwidth-intensive operations. Of course, one of ordinary skill in the art will recognize that such allocation of functions is exemplary only. In some implementations, the high-speed interface 1308 is coupled to the memory 1304, the display 1316 (e.g., through a graphics processor or accelerator), and to the high-speed expansion ports 1310, which can accept various expansion cards (not shown). In an implementation, the low-speed interface 1312 is coupled to the storage device 1306 and the low-speed expansion port 1314. The low-speed expansion port 1314, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, CSAE 102 can be implemented in a number of different forms, as shown in the figure. For example, it can be implemented as a standard server, or multiple times in a group of such servers. In addition, it can be implemented in a personal computer such as a laptop computer. It can also be implemented as part of a rack server system. Alternatively, components from the computing device 200 can be combined with other components in a mobile device (not shown), such as a mobile computing device.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one disclosure and/or at least one computer. The database can include a structured collection of records or data organized according to a database model, such as, for example, but not limited to at least one of a relational model, a hierarchical model, a network model or the like. The database can include a database management system disclosure (DBMS) as is known in the art. The disclosure may include, but is not limited to, for example, an disclosure program that can accept connections to service requests from clients by sending back responses to the clients. The database can be configured to run the disclosure, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one disclosure and/or at least one computer to perform services for connected clients as part of a client-server architecture. The server disclosure can include, but is not limited to, for example, an disclosure program that can accept connections to service requests from clients by sending back responses to the clients. The server can be configured to run the disclosure, often under heavy workloads, unattended, for extended periods of time with minimal human direction. The server can include a plurality of computers configured, with the disclosure being divided among the computers depending upon the workload. For example, under light loading, the disclosure can run on a single computer. However, under heavy loading, multiple computers can be required to run the disclosure. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The invention encompassed by the present disclosure has been described with reference to the accompanying drawings, which form a part hereof, and which show, by way of illustration, example implementations and/or embodiments. As such, the figures and examples above are not meant to limit the scope of the present disclosure to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various disclosures such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed is:

1. A computer-implemented method for information technology service management, the method comprising:
accessing, by at least one computing device configured by executing instructions stored on processor-readable media, a plurality of respective information technology service management (ITSM) requests from at least one user computing device;
for each one of the plurality of respective ITSM requests, determining, by the at least one computing device, whether the respective ITSM request is valid;
  i) where the request is not valid:
    assigning, by the at least one computing device, a status identifier representing the respective ITSM request is invalid; and
  ii) where the request is valid:
    identifying in the respective ITSM request, by the at least one computing device, request information representing at least a request for action associated with a back-end service, a target service name, and a target system;
    distinguishing in the respective ITSM request, by the at least one computing device, as a function of at least the request information, a technical infrastructure detail associated with the back-end service;
    generating, by the at least one computing device as a function of the technical infrastructure detail, a notification for implementing the action; and
    transmitting to at least one computing device associated with the back-end service, by the at least one computing device, the notification for implementing the action.

2. The method of claim 1, wherein the notification includes instructions to initiate operations associated with the action in a computing device associated with the back-end service, and further wherein the instructions are executed by the computing device associated with the back-end service.

3. The method of claim 1, wherein the action includes at least one of an Internet communication framework (ICF) node activation, remote function call creation, remote function call update, and software object importation into a respective production system.

4. The method of claim 1, wherein at least one of the respective ITSM requests and at the notification is formatted as a JSON file.

5. The method of claim 4, wherein accessing, by the at least one computing device, the plurality of respective ITSM requests further comprises:
periodically checking for presence of the JSON file;
establishing a secure data communication channel to at least one computing device associated with the back-end service; and
receiving the one of the respective ITSM requests via the secure data communication channel.

6. The method of claim 4, further comprising:
updating, by the at least one computing device, the JSON file with additional information representing at least one of the back-end service, the technical infrastructure detail associated with the back-end service, and the notification.

7. The method of claim 1, further comprising:
where the request is valid:
  for each of the respective ITSM requests:
    assigning, to the respective ITSM request by the at least one computing device, status information representing an outcome of the respective request is success, pending, or rejected.

8. The method of claim 7, wherein assigning the status information is made, by the at least one computing device, as a function of a webservice call to a ITSM system.

9. The method of claim 1, further comprising:
assigning, by the at least one computing device to the respective ITSM request, attribute information representing at least a request identifier and a due date for the respective ITSM request.

10. The method of claim 1, further comprising:
where the request is valid:
  for each of the respective ITSM requests:
    assigning, to the respective ITSM request by the at least one computing device, a respective landscape information representing a respective category associated with an identified function, wherein the respective landscape information further represents at least one system environment, wherein the target system is reachable as a function of the respective landscape information.

11. A computer-implemented system for information technology service management, the system comprising:
at least one computing device, wherein the at least one computing device is configured by executing instructions for:
accessing a plurality of respective information technology service management (ITSM) requests from at least one user computing device;
for each one of the plurality of respective ITSM requests, determining, by the at least one computing device, whether the respective ITSM request is valid;
  i) where the request is not valid:
    assigning, by the at least one computing device, a status identifier representing the respective ITSM request is invalid; and
  ii) where the request is valid:
    identifying in the respective ITSM request, by the at least one computing device, request information representing at least a request for action associated with a back-end service, a target service name, and a target system;
    distinguishing in the respective ITSM request, by the at least one computing device, as a function of at least the request information, a technical infrastructure detail associated with the back-end service;

generating, by the at least one computing device as a function of the technical infrastructure detail, a notification for implementing the action; and transmitting to at least one computing device associated with the back-end service, by the at least one computing device, the notification for implementing the action.

12. The system of claim 11, wherein the notification includes instructions to initiate operations associated with the action in a computing device associated with the back-end service, and further wherein the instructions are executed by the computing device associated with the back-end service.

13. The system of claim 11, wherein the action includes at least one of an Internet communication framework (ICF) node activation, remote function call creation, remote function call update, and software object importation into a respective production system.

14. The system of claim 11, wherein accessing, by the at least one computing device, the plurality of respective ITSM requests further comprises:

periodically checking for presence of one of a JSON file that includes at least one of the plurality of respective ITSM requests;

establishing a secure data communication channel to at least one computing device associated with the back-end service; and receiving the one of the respective ITSM requests via the secure data communication channel.

15. The system of claim 11, wherein the at least one computing device is configured by executing instructions for:

where the request is valid:

for each of the respective ITSM requests:

assigning, to the respective ITSM request by the at least one computing device, a respective landscape information representing a respective category associated with an identified function, wherein the respective landscape information further represents at least one system environment, wherein the target system is reachable as a function of the respective landscape information.

\* \* \* \* \*